United States Patent [19]
Courtois et al.

[11] Patent Number: 5,366,067
[45] Date of Patent: Nov. 22, 1994

[54] EXTRACTION DEVICE AND STORAGE AREA EQUIPPED WITH SUCH A DEVICE

[75] Inventors: Jean-Marie Courtois, Wailly Beaucamp; Albert Suratteau, 1,square Raynouard-78150, Rocquencourt, both of France

[73] Assignees: J M C (S.A.); Comet (S.A.); Albert Surratteau, all of France

[21] Appl. No.: 130,655

[22] Filed: Oct. 1, 1993

[30] Foreign Application Priority Data

Oct. 5, 1992 [FR] France .................. 92 12310

[51] Int. Cl.⁵ .......................................... B65G 65/16
[52] U.S. Cl. .................... 198/518; 198/519; 414/319; 414/326
[58] Field of Search ............ 198/518, 519, 624, 677, 198/511, 550.1, 550.6, 493; 414/326, 305, 310, 319, 320

[56] References Cited

U.S. PATENT DOCUMENTS

| 3,456,818 | 7/1969 | Massey | 198/674 X |
| 4,718,537 | 1/1988 | Miller | 414/320 X |
| 5,098,247 | 3/1992 | Campbell | 414/326 |
| 5,167,318 | 12/1992 | Siemens | 198/550.1 X |
| 5,180,272 | 1/1993 | Campbell | 414/326 X |
| 5,232,326 | 8/1993 | Golz et al. | 198/519 X |

FOREIGN PATENT DOCUMENTS 0471136 2/1992 European Pat. Off. .
1501174 11/1967 France .
2019927 11/1970 Germany .

Primary Examiner—Cheryl L. Gastineau
Attorney, Agent, or Firm—Ladas & Parry

[57] ABSTRACT

An extraction device comprises an inclinable scraper shaft driven in rotation along a first vertical axis of rotation, thereby extracting bulk products stored over a storage area having at least one evacuation opening. The extraction device comprises a support piece whose foundation is mounted to rotate above the evacuation opening along the first axis of rotation, defining a supporting base for the scraper shaft. The base is inclined by an angle $\beta$ with respect to the horizontal. The first driving member is provided to rotate the support piece and the scraper shaft about the first axis. The foundation of the scraper shaft is inclined with respect to the axis of the scraper shaft by an angle $\alpha$ complementary of the angle $\beta$ and is mounted to rotate on the base along a second axis of rotation perpendicular to said base. The extraction device further comprises a second driving member to rotate the scraper shaft about the second axis of rotation for adjusting the inclination of this shaft with respect to the vertical by an angle between 0° and 90°.

11 Claims, 4 Drawing Sheets

EXTRACTION DEVICE AND STORAGE AREA EQUIPPED WITH SUCH A DEVICE

FIELD OF THE INVENTION

The present invention relates to the extraction of a product in bulk, of the sugar, clinker, fly ash . . . type, stored over a storage area comprising at least one principal evacuation opening. It relates more particularly to an extraction device which is constituted by an inclinable scraper shaft intended to be rotatably mounted along a vertical axis above the evacuation opening of a storage area, as well as to a storage area equipped with such an extraction device.

In the present specification, the term "storage area" designates any surface capable of being used for storing a bulk product. It may be question of an open surface, or, on the contrary, of a surface defined by lateral walls. More particularly, the storage area may be constituted by the bottom of a storage reservoir. The present invention is particularly applicable to the extraction of a bulk product stored in a silo, of which the bottom constitutes a particular storage area.

BACKGROUND OF THE INVENTION

Document EP.O.471.136 in particular already discloses a device for extracting a bulk product stored in a silo comprising a central evacuation opening. This extraction device is constituted by a vertical central pole driven in rotation on itself, a support inclinable with respect to the central pole, and an Archimedean screw mounted on the support and driven in rotation on itself. The base of the support is fixed to the vertical central pole via a pivot connection of horizontal axis, and adjustment of the inclination of the support and consequently of the Archimedean screw, is effected with the aid of a suspension cable of which one end is fixed to the inclinable support, and of which the other end is wound around a winch fixed to the top of the central pole, in the vicinity of the top of the silo.

Prior to the silo being filled, the support and the Archimedean screw are maintained in equilibrium, via the cable, substantially along the central pole. Then, in order to empty the silo, the Archimedean screw is firstly rotated on itself, which has for its to disengage it, then the central pole is rotated on itself, which provokes rotation of the support and of the Archimedean screw about the central axis of the silo. Finally, the angle of inclination of the support and of the Archimedean screw with respect to the central pole is progressively increased by unwinding the suspension cable. Consequently, the Archimedean screw works on surface of the stored product, in a progressively larger upturned cone as the angle of inclination of the Archimedean screw with respect to the central pole increases, and pushes the product towards the central evacuation opening. As the Archimedean screw does not work in the mass of the product, except at start-up, the installed power necessary for this extraction device to operate is a function in particular of the dimension and mass of the Archimedean screw and of the support, and depends only little on the mass of the product to be extracted.

However, this extraction device presents the following drawbacks: Prior to the silo being filled, the support and the Archimedean screw, due to their articulation with respect to the central pole, cannot be positioned in a strictly vertical plane. Consequently, they must forcibly be maintained in equilibrium in their initial position before filling, via the suspension cable, order to avoid their pivoting in a vertical plane under the action of their own weight. The silo in which this extraction device is mounted, is filled by introducing by gravity the bulk product to be stored, via an opening made at the top of the silo. The bulk product thus introduced exerts a high pressure on the support and the Archimedean screw, which provokes a considerable increase in the tension of the suspension cable and consequently in the tension that the central pole must support addition, when emptying of the silo is terminated, order to return the support and Archimedean screw into initial position before filling, it is necessary to pivot them in a vertical plane through an angle of about 90°, by winding the suspension cable. In that case, the central pole must also be able to withstand the tension exerted by this suspension cable, whatever the angle of inclination of the support and of the Archimedean screw with respect to the central pole, this tension increasing with the angle of inclination. In conclusion, the central pole must be sufficiently rigid and be sufficiently anchored vertically in order to withstand the tension of the cable, this increasing with the storage capacity of the silo and the weight of the Archimedean screw and of the support.

In the extraction device of document EP.O.471.136, it is necessary, at the beginning of extraction, for the extraction screw to be able to be rotated about the vertical axis of the central pole, that this screw be disengaged from the bulk product in which it is embedded. To that end, it is necessary, on the one hand, that this screw be of the Archimedean type, and, on the other hand, that it may be rotated on itself, so as to evacuate the bulk product towards the central opening of the storage area. Such rotation of the extraction screw on itself, when it is embedded in the mass, requires a considerable installed power. This installed power must be all the greater as the bulk product may form conglomerates which oppose this rotation.

In practice, it has proved that the use of an extraction device such as the one described in document EP-.O.471.136, with an Archimedean screw whose length exceeds 15 meters, is very difficult due, on the one hand, to the too high tensions to which the suspension cable and the central pole are subjected and, on the other hand, the installed power necessary for start-up of the extraction screw. This extraction device is therefore unsuitable for emptying silos having a large storage capacity anon in particular silos of circular base whose ground diameter exceeds 30 meters.

It is an object of the present invention to propose a device for extracting a bulk product, of the bulk sugar, clinker, fly ash . . . type, stored over a storage area comprising at least one evacuation opening, and which overcomes the drawbacks of the extraction device set forth hereinabove.

SUMMARY OF THE INVENTION

This object is attained by the extraction device of the invention which, in known manner, comprises an inclinable scraper shaft driven in rotation along a first vertical axis of rotation.

The extraction device is characterized according to the invention in that it comprises:

a so-called support piece, whose foundation is mounted to rotate above the evacuation opening of the storage area, along the first axis of rotation and whose base is inclined by an angle β with respect to the horizontal;

and first-means for driving the support piece in rotation about the first axis of rotation; the foundation of the scraper shaft is inclined with respect to the axis of the scraper shaft by an angle α complementary of angle β and is mounted to rotate on the base of the support piece along a second axis of rotation perpendicular to said base; and the device further comprises second means for driving the scraper shaft in rotation about the second axis of rotation for adjusting the inclination of the shaft with respect to the vertical by an angle included between 0° and 90°.

It is to Applicants' merit firstly to have demonstrated that the use of a central pole presented drawbacks which limited the dimension of the extraction devices, and in particular the Archimedean extraction screw and, secondly, to have sought to eliminate this central pole whose use seemed indispensable up to the present time, in order to avoid the drawbacks thereof.

It was indeed known by document FR.1.501.174, which relates to a device for placing vertical a superstructure, of the tower crane mast type, supported by a substructure, to use means similar to those allowing the inclination of the scraper shaft of the extraction device of the invention. However, within the framework of this Patent, the technical function of these means is to allow adjustment of the inclination of a mast with respect to the vertical by an angle of low value, about 7°, for the sole purpose of placing this mast vertical, when the substructure is on slightly sloping ground. These known means have in the present invention a novel function which is that of allowing adjustment of the inclination of the scraper shaft by an angle included between 0° and 90°, and solve problems which were not raised within the framework of the use of these means as described in document FR.1.501.174.

The advantages procured by the extraction device of the invention are as follows: the angles α and β being complementary, it is possible to position the scraper shaft in a strictly vertical plane prior to storing the product over the storage area. Being question of an extraction device mounted inside a silo whose top comprises a central opening, the bulk product which is introduced via this opening, when the silo is being filled, does not exert on the scraper shaft a pressure capable of inclining it in a vertical plane.

Furthermore, at the start of extraction, in order to disengage the scraper shaft of the extraction device of the invention which is positioned in a vertical plane, it suffices to evacuate the bulk product by gravity via the evacuation opening of the storage area. Contrary to the extraction device of document EP.O.471.136, it is therefore not necessary for the scraper shaft of the invention to be an Archimedean screw and for it to be able to be rotated on itself.

Thus, contrary to the Archimedean screw of document EP.O.471.136, the scraper shaft of the invention does not have for its principal function to push the matter by screw effect towards the evacuation opening, but scrape the surface of the product in a progressively larger upturned cone, so as to provoke regular advance of the product towards the evacuation opening, upon each unitary rotation of the scraper shaft about the first axis of rotation. Another function of the scraper shaft is to destroy the possible conglomerates, which might form within the bulk product; this phenomenon of conglomeration is produced for example when the bulk product is sugar stored in a humid atmosphere.

The first and second means for driving in rotation are preferably respectively constituted by a first drive unit rotating a first roller ring fast with the foundation of the support piece, and by a second drive unit rotating a second roller ring fast with the foundation of the scraper shaft.

In order that the angle of inclination of the scraper shaft with respect to the vertical may vary between 0° and 90°, by a rotation through 180° of the scraper shaft about the second axis of rotation, the measurement of angle α is equal to the measurement of angle β and is consequently 45°.

According to a particular embodiment, the body of the scraper shaft comprises a helicoidal turn, which makes it possible to have a more regular and homogeneous advance of the product towards the evacuation opening In this particular embodiment, the body of the shaft is preferably truncated in form.

Although it is not the principal function of the scraper shaft, it may prove useful to be able to provoke advance of the product towards the evacuation opening of the storage area by using the screw effect, as is described in document EP.O.471.136. This makes it possible to obtain a more rapid advance of the product towards the evacuation opening and to break more easily conglomerates which might possibly have formed within the bulk product. Consequently, a part of the body of the scraper shaft is advantageously mounted to rotate along the axis of the scraper shaft, when the latter is made in accordance with the particular embodiment mentioned above. In that case, the extraction device of the invention also comprises third means for rotating said rotatable part of the body of the scraper shaft about said axis.

The use of these three means for driving in rotation is particularly advantageous for effecting advance of the product by screw effect, towards the evacuation opening, when the scraper shaft is considerably inclined with respect to the vertical and in particular when it is in a horizontal position.

The invention also relates to an area for storing bulk products, comprising at least one evacuation opening, said storage area being characterized in that it is equipped with an extraction device according to the invention.

For such a storage area, without other means for forced evacuation of the bulk product, it is necessary, at the beginning of emptying, to effect an evacuation by gravity of the stored product, particularly via the evacuation opening, so as to release the scraper shaft which is in vertical position, and to be able to start to actuate the first and second means for driving in rotation.

In order to facilitate this evacuation by gravity, in a first particular embodiment, the storage area of the invention advantageously comprises a plurality of obturatable secondary openings made on either side of the evacuation opening. Obturation of the secondary openings may for example be controlled via electro-valves, whose action makes it possible to adjust to a certain extent the flowrate of the product evacuated by gravity.

According to a second particular embodiment, the storage area is equipped with means for fluidizing the stored product. Such means are known to the man skilled in the art, and consist for example in the injection of an ascending air flow through a porous membrane disposed on the periphery of the evacuation opening. The product which is thus fluidized may flow more easily by gravity through the evacuation opening.

A third particular embodiment of the storage area combining the first two particular embodiments mentioned above, may also be imagined.

The first three particular embodiments mentioned above are particularly well adapted to effect extraction of a bulk product which is easy to extract by gravity, which is the case for example of white sugar, clinker in powder form, or cereals. However, it is inoperative for bulk products whose consistency does not allow, or only little, flow by gravity, which is the case of brown sugar in bulk. It is therefore necessary to equip the storage area of the invention with means for forced evacuation of the bulk product. To that end, according to a fourth particular embodiment, the storage area of the invention further comprises at least one substantially horizontal extraction screw, mounted to rotate below the foundation of the support piece, and fourth and fifth means for rotating the extraction screw respectively on itself and around the first axis of rotation of the extraction device.

In the course of its rotation about the first axis of rotation, the extraction screw sweeps the storage area in a circular zone. Moreover, the rotation on itself of the extraction screw makes it possible to push the product located in this circular zone up to the evacuation opening. Consequently, all the bulk product located plumb with this circular zone may be emptied via the bottom.

Being question in particular of a bulk produce which cannot flow by gravity, the action of this extraction screw advantageously makes it possible to disengage the scraper shaft of the extraction device of the invention at the beginning of evacuation of the bulk product. Subsequently, during extraction, the scraper shaft allows the bulk product to advance to the zone located plumb with the circular zone swept by the extraction screw. The latter further allows disintegration of the conglomerates which might have formed within the product and which were not completely destroyed by the scraper shaft, and consequently ensures regulation of the flowrate of the product evacuated.

In the fourth particular embodiment mentioned above, the storage area preferably comprises an excavation serving as housing for the extraction screw. Consequently, it is possible to sweep the storage area over two levels; sweeping of the first, upper level is ensured by the scraper shaft of the extraction device of the invention, and sweeping of the second, lower level, which corresponds to the bottom proper of the excavation is ensured by the extraction screw.

In a preferred embodiment, the storage area will be constituted by the combination of the particular embodiments mentioned above, which makes it possible to have a polyvalent storage area which may be used for storing bulk products able to flow by gravity, such as white sugar in bulk, as well as for storing bulk products which do not flow by gravity, or only little, such as brown sugar in bulk. Moreover, being question of a circular storage area comprising a central evacuation opening, the length L of the scraper shaft is preferably substantially equal to the radius of the storage area. Consequently, the extraction device of the invention allows the storage area to be completely emptied.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
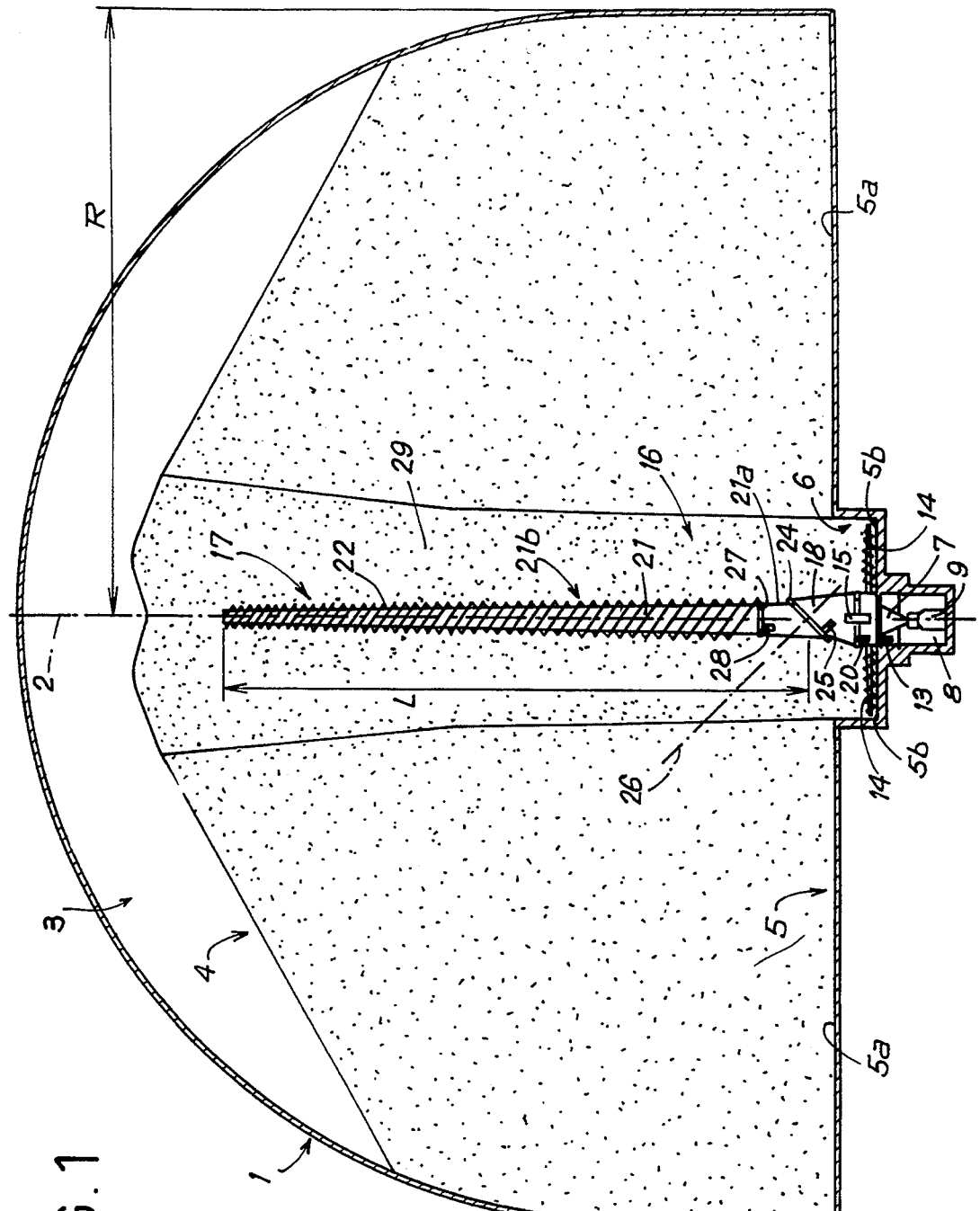
FIG. 1 is a view in section of a domed silo according to the invention, at the beginning of emptying.
Figure 2:
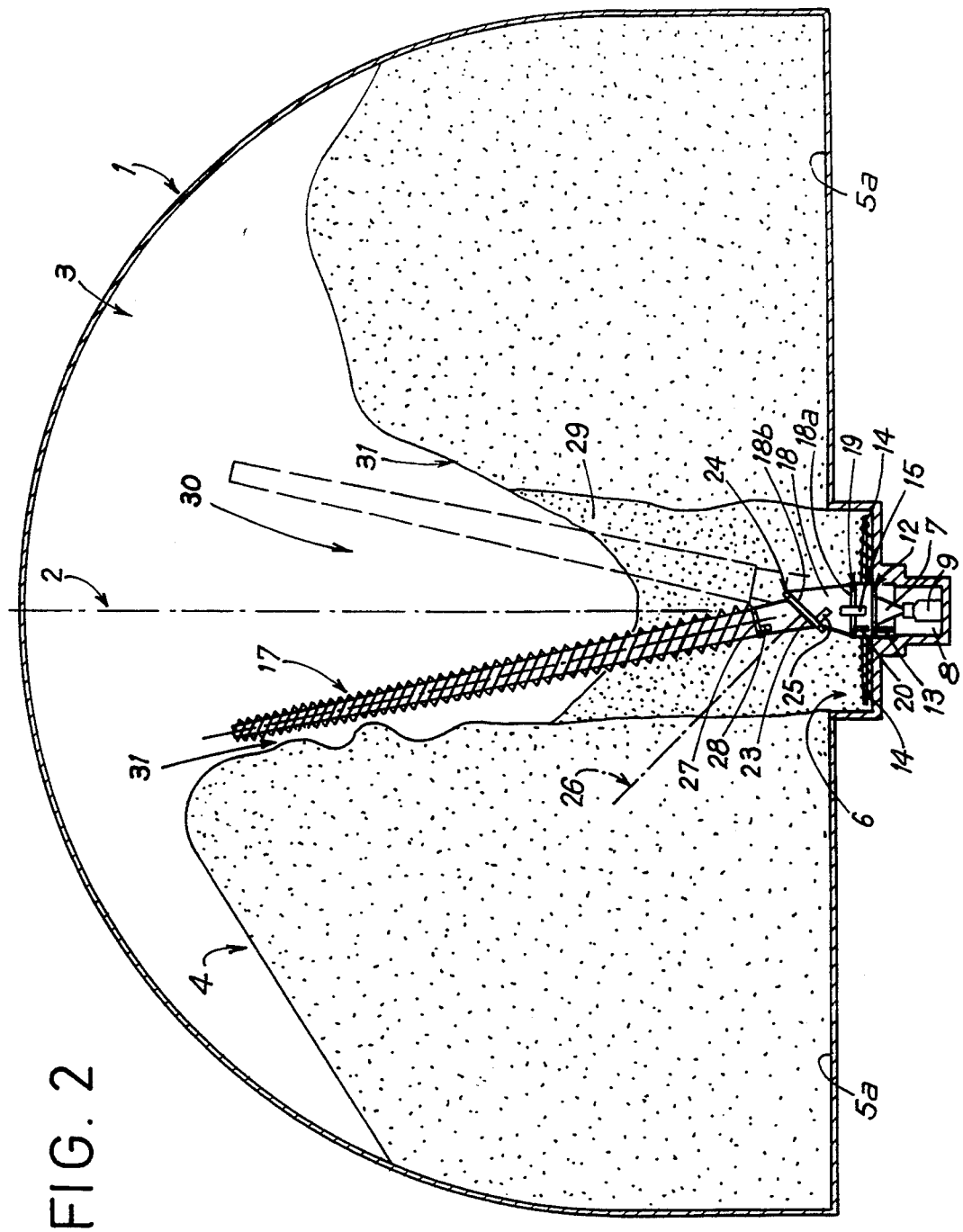
FIG. 2 is a view in section of the silo of FIG. 1, during emptying.
Figure 3:
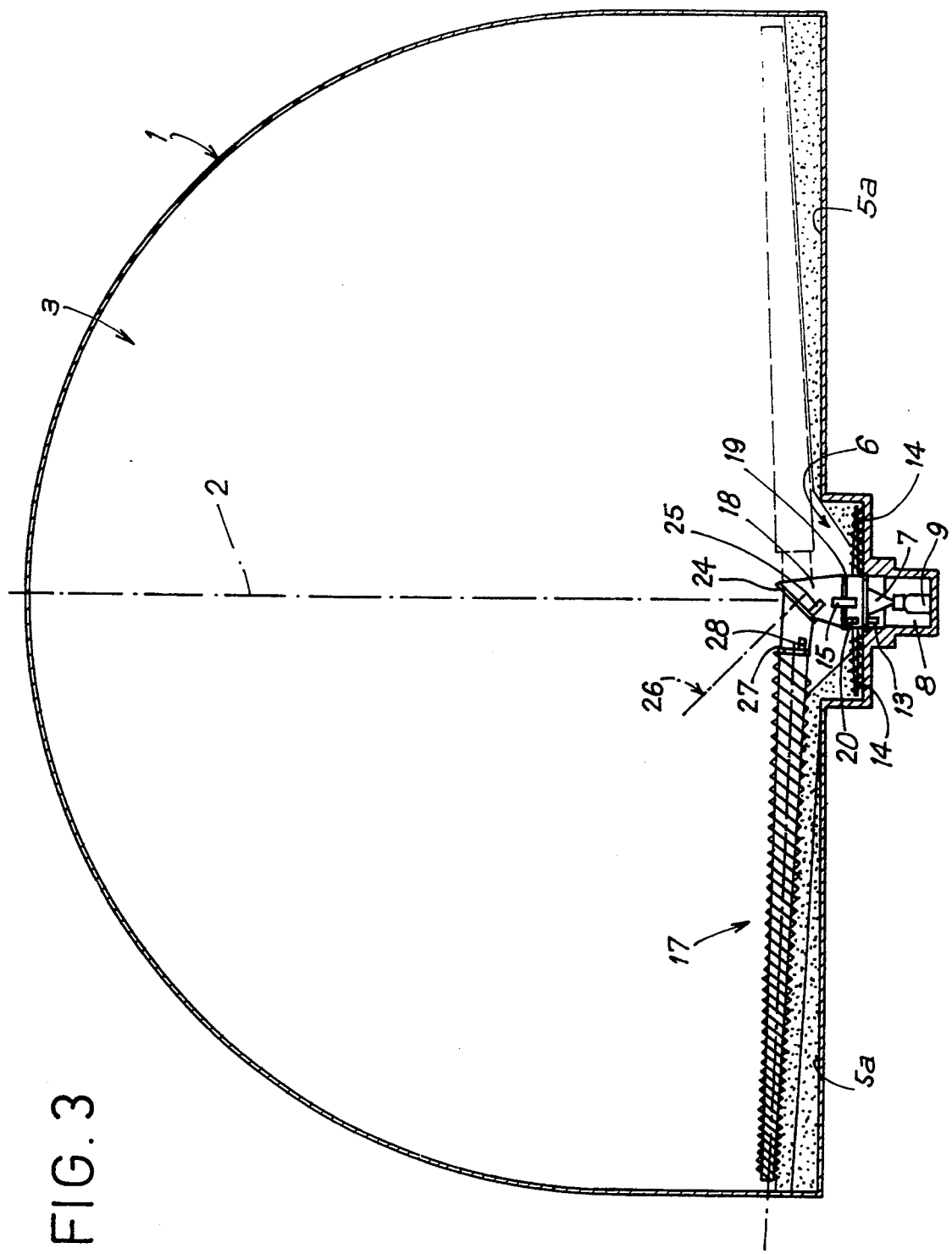
FIG. 3 shows the silo of FIGS. 1 and 2 at the end of emptying.

Referring now to the drawings, FIGS. 1, 2 and 3 schematically show a domed silo 1 of central axis 2 whose inner volume 3 occupies on the ground a disc of radius R.

Such a silo is used for storing bulk products such as sugar, clinker, cereals . . .

It is filled by introducing the bulk product which it is desired to store temporarily, by gravity through an opening (not shown) made in the top of the silo 1. To that end, the product is conveyed outside the silo with the aid for example of a conveyor belt up to a supply hopper communicating with said opening. A more or less regular pile 4 of bulk product is thus produced, which may possibly occupy all the inner volume 3 of the silo 1.

The bottom 5 of the silo 1 comprises a central, circular excavation 6. Consequently, this bottom 5 is constituted by a horizontal upper part 5a and a horizontal lower part 5b which corresponds to the bottom proper of the excavation 6.

The lower part 5b comprises a central evacuation opening 7, which communicates with an underground gallery 8 in which is mounted a conveyor belt 9. This central evacuation opening 7 serves to empty the silo, the evacuated product then being conveyed to the outside via the conveyor belt 9.

The lower part 5b also comprises a plurality of obturatable secondary evacuation openings (not shown) whose closure is controlled by means of electro-valves, and which are disposed regularly on either side of the central evacuation opening 7, in a direction parallel to the general direction of the conveyor belt 9, i.e. in a direction perpendicular to the plane of section of FIGS. 1 to 3. The use of such secondary evacuation openings has already been described, in particular in document FR.2.339.557.

Figure 4:
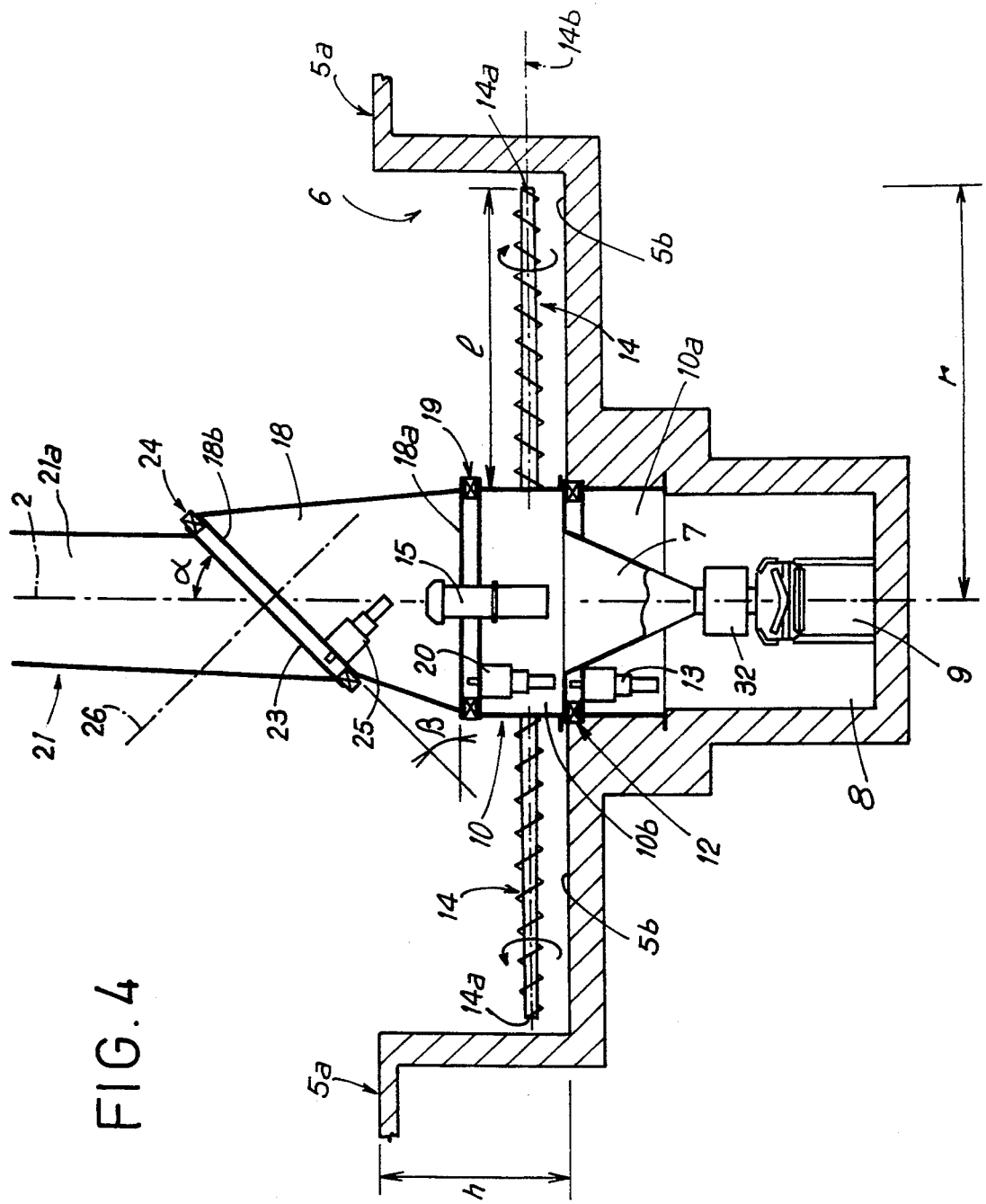
FIG. 4 schematically shows the first, second, fourth and fifth means for driving in rotation.

Referring to FIG. 4, the silo 1 is equipped with a central turret 10 constituted by two superposed hollow cylinders 10a, 10b.

The lower cylinder 10a is firmly anchored in the lower part 5b of the bottom 5 of the silo 1, above the central evacuation opening 7.

The upper cylinder 10b is mounted to rotate along the central axis 2 of the silo, on the lower cylinder 10a, via a roller ring 12. This roller ring 12 is driven in rotation with the aid of a drive unit 13, of the gear motor type, which is housed inside the lower cylinder 10a.

The upper cylinder 10b is equipped with two identical extraction screws 14 of the Archimedean screw type, of length 1. These two screws are fixed radially to the periphery of the upper cylinder 10b so that they are located in the same substantially horizontal plane, near the lower part 5b of the bottom 5 of the silo 1, and are diametrically opposite with respect to the central axis 2 of the silo.

The distance separating the central axis 2 of the silo 1 from the end 14a of an extraction screw 14 is substantially equal to the radius r of the lower part 5b of the bottom 5 of the silo. The excavation 6 thus acts as housing for the two extraction screws 14.

Rotation of the upper cylinder 10b along the central axis 2 of the silo 1 provokes rotation of the extraction screws 14 in a substantially horizontal plane, the extraction screws 14 consequently sweeping the whole of the lower part 5b.

The turret 10 is also equipped with a drive unit 15 allowing simultaneous rotation of the two extraction screws 14 on themselves, i.e. along the same horizontal axis 14b.

The two drive units 13 and 15 being independent, the two movements of rotation of the extraction screws 14 may therefore have different speeds.

The silo 1 of FIG. 1 is also equipped with an extraction device 16 constituted in particular by an inclinable scraper shaft 17 of length L, and by a hollow support piece 18.

With reference to FIG. 4, the foundation 18a of the support piece 18 is mounted to rotate along the central axis 2 of the silo, on the upper cylinder 10b of the turret 10, via a roller ring 19. This roller ring 19 is driven in rotation along the central axis 2 of the silo via a drive unit 20, of the gear motor type, housed inside the upper cylinder 10b. The drive unit 20 via the roller ring 19 therefore allows the support piece 18 to rotate on itself.

The upper face of this support piece 18 constitutes a base 18b, inclined by an angle $\beta$ with respect to the horizontal.

Referring to FIG. 1, the scraper shaft 17 is constituted by a hollow body 21 of truncated shape which may be made of steel. This body 21 is constituted by a smooth lower part 21a and an upper part 21b whose outer surface is provided with a helicoidal turn 22.

The foundation 23 of the scraper shaft 17 corresponds to the lower face of the truncated body 21 shown in FIG. 4, and is inclined by an angle $\alpha$ with respect to the axis of the truncated body 21. This foundation 23 rests on the base 18b of the support piece 18 via a roller ring 24, so that the axis of the truncated body 21 of the scraper shaft 17 merges with the central axis of the silo, when the scraper shaft is in a vertical position, as is shown in FIGS. 1 and 4.

The roller ring 24 is driven in rotation via a drive unit 25 of the gear motor type, which is housed inside the support piece 18.

This drive unit 25 makes it possible, via the roller ring 24, to rotate the lower part 21a of the truncated body 21 and consequently the whole of the scraper shaft 17 about an axis 26 perpendicular to the base 18b of the support piece 18. Such rotation of the scraper shaft 17 about this axis 26, due to the angles of inclination $\alpha$ and $\beta$, has for effect to provoke inclination of this scraper shaft 17 with respect to the central axis 2 of the silo 1. In the particular embodiment of FIG. 4, the angles $\alpha$ and $\beta$ measure 45°. Consequently, the inclination of the scraper shaft 17 with respect to the central axis 2 of the silo may be adjusted between 0° and 90°, by a rotation of the scraper shaft 17 through 180°.

The support piece 18 is dimensioned so that the helicoidal thread 22 of the scraper shaft 17 is virtually in contact with the upper part 5a of the bottom of the silo, when the angle of inclination of the scraper shaft measures 90°. It should be noted on this subject that the body 21 of the scraper tends to bend under the action of its own weight and of the weight of the helicoidal turn 22, when the scraper shaft is sufficiently inclined. It is therefore possible to use this bending to compensate the truncated shape of the body 21 so that the helicoidal turn may be parallel to the lower part 5a of the bottom 5 of the silo, which makes it possible to obtain a more complete emptying of the silo.

The upper part 21b of the truncated body 21 of the scraper shaft 17 is also mounted to rotate with respect to the lower part 21a, via a roller ring 27. This roller ring is driven in rotation via a drive unit 28, of the gear motor type, housed inside the lower part 21a of the truncated body 21. The drive unit 28 allows, via the roller ring 27, rotation of the upper part 21b of the scraper shaft 17, along the axis of the truncated body 21 of the scraper shaft 17.

To give a precise example, the radius R of the base of the silo 1 was substantially equal to the length L of the scraper shaft 17 and measured about 30 meters. The radius r of the excavation 6 was about 5 meters, for a height h of the excavation of about 2 meters. The length L of an extraction screw 14 was about 4 meters.

The use of roller rings makes it possible to obtain a rotatable and tight assembly of the different pieces with respect to one another. Consequently, the drive units 13, 15, 20, 25 and 28, which are housed inside an inner cavity defined by the lower (10a) and upper (10b) cylinders of the turret 10 and by the support piece 18, and the lower part 21a of the truncated body 21, are never in contact with the bulk product and undergo no pressure from this product. Moreover, these different drive units, due to their localization within said cavity, are of very easy access, via the underground gallery 8. Maintenance or repair of these different drive units is then easier to carry out.

The silo which has just been described may be used for temporarily storing bulk products of all types, i.e. bulk products of the white sugar type which may be evacuated by gravity, or of the brown sugar type which cannot be evacuated by gravity due to their consistency. The principle of emptying of the silo 1 which will now be described will be a function of the bulk product stored.

The principle of emptying the silo 1 in which is stored a bulk product which is difficult to extract by gravity, of the brown sugar type, is as follows:

Initially, the scraper shaft 17 is in vertical position, as shown in FIG. 1, and in the present case is embedded in the mass of the bulk product. In a first step, the bulk product located plumb with the excavation 6 is firstly evacuated via the bottom, i.e. with reference to FIG. 1, the bulk product contained in a zone 29 forming a substantially vertical stack. Such evacuation at the bottom is effected by driving the two extraction screws 14 in rotation along their horizontal axis 14b and along the central axis 2 of the silo 1, via the drive unit 15 and the drive unit 13/roller ring 12 assembly, respectively. The double rotation of the two extraction screws 14 makes it possible, on the one hand, to sweep all the bottom of the excavation 6, i.e. the lower part 5b of the bottom 5 of the silo, and, on the other hand, to push the bulk product, under the screw effect, up to the central evacuation opening 7, through which it may flow as far as the conveyor belt 9, thereafter being conveyed to outside the silo. If the bulk product has undergone conglomeration during storage thereof, it may happen that the action of the two extraction screws creates a vault at the base of zone 29. However, being given the amount of pressure exerted on this vault by the bulk product located plumb with the excavation 6, said vault rapidly collapses, and the extraction screws 14 continue to evacuate the bulk product at the bottom.

This first step of evacuation of the bulk product via the bottom creates within zone 29 an upturned cone which enables the scraper shaft 17 to be disengaged. In a second step, when the scraper shaft 17 is sufficiently disengaged, it is driven in rotation about the central axis 2 of the silo and via the drive unit 20 and the roller ring 19. The inclination of this scraper shaft 17 with respect to the central axis 2 of the silo is then progressively increased by rotating it slowly along axis 26.

With reference to FIG. 2, the scraper shaft 17, during its rotation about the central axis 2 of the silo, destabilizes the pile 4 of bulk product by scraping the surface 31 of the upturned cone 30 which was created within this pile. When the scraper shaft 17 is only slightly inclined with respect to the central axis 2 of the silo, its action principally provokes slide by gravity of the bulk product to the zone 29 located plumb with the excavation 6. At the same time, the extraction screws 14 continue their action and allow a regular evacuation of the bulk product located in zone 29.

From a greater angle of inclination whose value depends on the consistency of the bulk product, the scraper shaft 17 no longer allows in practice slide of the bulk product, but ensures a progressive conveying of the bulk product towards the excavation 6; the advance of the bulk product upon each unitary rotation of the scraper shaft corresponds substantially to the pitch of the helicoidal turn 22. Such progressive conveying of the bulk product is particularly effected when the scraper shaft 17 is in a position close to the horizontal, as shown in FIG. 3. In that case, emptying of the silo is virtually terminated.

It is also advantageous, from a certain angle of inclination of the scraper shaft 17, to rotate the upper part 21a of the body 21 of the scraper shaft via the drive unit 28 and the roller ring 27, in order in particular to accelerate emptying of the silo, by pushing the bulk product towards the excavation 6 under the screw effect.

In order to effect evacuation of a bulk product able to be extracted by gravity, it is unnecessary to use the extraction screws 14 as has just been described. The principle of emptying is in that case as follows: The bulk product is firstly evacuated by gravity via the central evacuation opening 7, and possibly via the secondary evacuation openings (not shown). Such evacuation by gravity has for its effect to create an upturned cone which enables the scraper shaft 17, which is in vertical position as shown in FIG. 1, to be disengaged. The scraper shaft 17 is then actuated, as described hereinabove. All the bulk product located plumb with the excavation 6 is therefore, in this working principle, evacuated by gravity. It is then possible to regulate this evacuation by gravity by controlling obturation of the evacuation opening 7 and possibly of the secondary openings, with the aid of electro-valves. It is also possible to combine the two principles of evacuation which have just been described, employing evacuation by gravity or evacuation via the bottom with the aid of the extraction screws 14, during the same emptying.

The silo may also comprise forced ventilation means 32, allowing the injection of an ascending air flow through the evacuation opening 7, so as to fluidize the bulk product located near the evacuation opening 7, which renders evacuation thereof by gravity easier.

It is also possible, without departing from the scope of the invention, to make openings in the truncated body 21 and in particular in its upper part 21b, and to inject pressurized air inside the hollow body 21. In that case, the air which is evacuated via said openings contributes to the destabilization of the pile 4 of bulk product and facilitates slide of the product.

The man skilled in the art can determine the installed power necessary for operating the scraper shaft 17 and the two extraction screws 14, as a function of their size and the mass of the product which may be stored in the domed silo. On this subject, it should be noted that, as the extraction screws 14 work in the mass of the product, contrarily to the scraper shaft 17, the dimension of these screws is preferably small, with respect to the dimension of the scraper shaft, in order to reduce the installed power.

Furthermore, it is also possible, within the framework of the invention, to replace the system of extraction screws 14, allowing a regulated evacuation of the bulk product via the bottom, by any other system performing the same function.

What is claimed is:

1. An extraction device for the extraction of bulk products stored over a storage area having at least one evacuation opening, said device comprising a support piece having its foundation mounted to rotate above the evacuation opening along a first vertical axis of rotation and defining a supporting base that is inclined by an angle $\beta$ with respect to the horizontal; first means for driving the support piece in rotation about the first axis of rotation; an inclinable scraper shaft being rotable together with the support piece along the first axis of rotation, wherein the foundation of the scraper is inclined with respect to the axis of the scraper shaft by an angle $\alpha$ complementary of said angle $\beta$, and mounted on the supporting base to be rotatable along a second axis of rotation perpendicular to said base; and second means for driving the scraper shaft in rotation about the second axis of rotation for adjusting the inclination of the scraper shaft with respect to the vertical by an angle between 0° and 90°.

2. The extraction device of claim 1, wherein the first driving means include a first drive unit rotating a first roller ring fastened with the foundation of the support piece, and the second driving means include a second drive unit rotating a second roller tying fastened with the foundation of the scraper shaft.

3. The extraction device of claim 1, wherein the angles $\alpha$ and $\beta$ are 45°.

4. The extraction device of claim 1, wherein the body of the scraper shaft comprises a helicoidal turn.

5. The extraction device of claim 4, wherein the body of the scraper is truncated in shape.

6. The extraction device of claim 4, wherein a part of the body of the scraper shaft is mounted to rotate along the axis of the scraper shaft, and a third driving means is provided for rotating said rotatable part about said scraper shaft axis.

7. An area for storing bulk products, comprising at least one evacuation opening, and an extraction device including a support piece rotatably mounted above the evacuation opening and defining a supporting base inclined by an angle $\beta$ with respect to the horizontal; first means for driving said support piece to rotate about a first verticle axis of rotation; an inclinable scraper mounted on said inclined supporting base to rotate together with the support piece about the first axis and capable of rotating along a second axis of rotation perpendicular to said base, wherein the foundation of the scraper shaft is inclined with respect to the axis of the scraper shaft by an angle $\alpha$ complementary of said angle $\beta$; and second means for driving the scraper shaft to rotate about the second axis of rotation for adjusting the inclination of said shaft with respect to the vertical by an angle between 0° and 90°.

8. The storage area of claim 7 further comprising means for fluidizing the bulk product stored.

9. The storage area of claim 7 further comprising at least one substantially horizontal extraction screw rotatably mounted below the foundation of the support piece, and fourth and fifth means for driving the extraction screw respectively to rotate about its on axis and about the first axis of rotation of the extraction device.

10. The storage area of claim 9, wherein an excavation is formed adjacent to the evacuation opening for housing the horizontal extraction screw.

11. The storage area of claim 7, wherein the storage area is circular, and the evacuation opening is centrally located, the length of the scraper being substantially equal to the radius of the storage area.

* * * * *